United States Patent Office 2,987,817
Patented June 13, 1961

---

2,987,817
METHOD OF BRAZING
Roland Arthur Kozlik, Livingston, N.J., assignor to The International Nickel Company, Inc., New York, N.Y., a corporation of Delaware
No Drawing. Filed June 3, 1957, Ser. No. 663,312
2 Claims. (Cl. 29—494)

The present invention relates to the joining of metal articles by brazing and, more particularly, to a simple method for joining by brazing metal articles of widely varying composition.

Brazing is a simple and very useful method for joining metal articles and is a method of joining which may be employed to produce metal articles which are quite complex in structure. In the past, brazing has been a highly specialized art and it has been necessary to select with great care the brazing material employed, depending upon the nature of the metal articles to be joined. Thus, in many instances, brazing materials which would be satisfactory for joining articles made of copper are entirely unsatisfactory when employed for joining metal articles of a different composition, for example, nickel and nickel alloys containing chromium.

A simple method which may be employed for brazing many different types of alloys having wide variations of composition has now been discovered.

It is an object of the present invention to provide a simple method for joining metals by brazing which may be applied to many metals having widely varying compositions.

It is a further object of the present invention to provide a means for joining metal articles by brazing which may be applied to the fabrication of complex mechanical structures.

It is a still further object of the invention to provide a method for producing brazed joints in metal articles, which joints will have substantial mechanical strength.

Other objects and advantages of the invention will become apparent from the following description.

Broadly stated, the invention comprises applying to selected surface portions of metal articles a brazing compound comprising a reducible oxygen-containing phosphorus compound, contacting the portions of said metal articles bearing the brazing compound and subjecting said articles to a temperature in the range of about 1300° F. to about 2100° F. under reducing conditions for sufficient time to effect a brazed joint between said metal articles at the places where said brazing compound is applied. The satisfactory oxygen-containing hydrogen-reducible, phosphorus compound employed is a phosphorus oxide or acid, an ammonium phsphate or phosphite, an alkali metal phosphate or phosphite wherein the atomic ratio of alkali metal to phosphorus is not greater than about 2:1, or an alkaline earth metal phosphate or phosphite wherein the atomic ratio of alkaline earth metal to phosphorus is not greater than about 1:1. Thus, phosphorus oxides including phosphorus trioxide ($P_2O_3$), phosphorus tetraoxide ($P_2O_4$) and phosphorus pentoxide ($P_2O_5$); acids of phosphorus including phosphorous acid ($H_2(HPO_3)$), pyrophosphoric acid ($H_4P_2O_7$), hypophosphorous acid ($H(H_2PO_2)$), hypophosphoric acid ($H_4P_2O_6$), phosphoric acid ($H_3PO_4$), pyrophosphorous acid ($H_4P_2O_5$)

ammonium phosphates and phosphites including diammonium hydrogen phosphate (($NH_4)_2HPO_4$), ammonium hypophosphate (($NH_4)_2H_2P_2O_6$), ammonium di-hydrogen phosphate ($NH_4H_2PO_4$), ammonium hypophosphite ($NH_4H_2PO_2$), ammonium di-hydrogen phosphite ($NH_4H_2PO_3$); alkali metal phosphates and phosphites including sodium pyrophosphate ($Na_4P_2O_7$), sodium hypophosphite ($NaH_2PO_2$), sodium ammonium phosphate ($NaNH_4HPO_4$), potassium di-hydrogen phosphate ($KH_2PO_4$), potassium mono-hydrogen phosphate ($K_2HPO_4$)

and alkaline earth metal phosphates including monobasic calcium phosphate and di-basic calcium phosphate are examples of phosphorus compounds which may be employed in accordance with the invention.

It is convenient to prepare the brazing compound as a water slurry or paste and to permit the slurry or paste to dry after application to pre-selected portions of the metal articles to be joined before brazing is carried out. The liquid content of the slurry may vary from as little as 0% liquid to as much as 95% liquid, depending upon the application, i.e., whether the slurry is to be applied by spraying, dipping, brushing or otherwise. If desired, a flux such as oxygen-containing boron compounds, e.g., borax ($Na_2B_4O_7 \cdot 10H_2O$), sodium tetraborates ($Na_2B_4O_7$ and $Na_2B_4O_7 \cdot 5H_2O$), sodium metaborates ($Na_2B_2O_4$ and $Na_2B_2O_4 \cdot 4H_2O$), sodium perborates ($NaBO_3 \cdot H_2O$ and $NaBO_3 \cdot 4H_2O$), boric oxides ($B_2O_3$ and $B_2O_3 \cdot 3H_2O$), ortho boric acid ($H_3BO_3$) and pyro boric acid ($H_2B_4O_7$), and alkali and alkaline earth metal halides, e.g., sodium fluoride (NaF) and calcium fluoride ($CaF_2$), may be included in the brazing compound to facilitate attack or solution of metal oxides present on the metal surfaces to be brazed. When the oxygen-containing boron compounds are employed as fluxes, the anhydrous varieties are preferred. The flux content of the dry mixture may be up to about 25% by weight, although the flux content should be kept to the smallest amount consistent with the desired fluxing effect.

Metal articles to be joined by brazing in accordance with the invention may be made from copper, nickel, cobalt, iron or manganese, and alloys of these metals, including alloys of these metals with each other, alloys of these metals with up to about 25% of chromium and other alloys wherein these metals constitute at least about 50% of the composition. These metals and alloys may also contain the usual small amounts of impurities and alloying amounts of silver, cadmium, lead, bismuth, tin, zinc, boron, silicon, zirconium, aluminum, vanadium, molybdenum, chromium, tungsten, titanium, columbium, etc. These metal articles thus are made from metals having atomic numbers from 25 to 29 and alloys of these metals. The metal articles to be joined may be free from oxide or may be oxidized. For example, the invention may be employed in the case of nickel-chromium alloys, cobalt-chromium alloys, iron-chromium alloys, cobalt-chromium-iron alloys, nickel-chromium-iron alloys, nickel-containing and manganese-containing stainless steels and similar alloys which contain up to about 25% of chromium and which often possess a characteristic chromium-containing oxide. Satisfactory brazed joints can be made in such materials when carrying out the process embodying the present invention despite the presence of a chromium-containing oxide or other oxide, including the oxides of the metals having atomic numbers from 25 to 29.

It is preferred in carrying out the invention to conduct the brazing operation in a strongly reducing hydrogen-containing atmosphere such as that provided by dry hydrogen or dissociated ammonia.

The temperature at which brazed joints may be produced in accordance with the invention will depend upon the nature of the metallic component of the brazing material formed in carrying out the invention. The said metallic component is derived from the parent metal being brazed as a result of reaction with the phosphorus compound employed in the strongly reducing environment contemplated in accordance with the invention. Thus, in the case of copper and copper-base alloys, a brazing temperature of about 1320° to about 2000° F. is satisfactory. In the case of cobalt and cobalt-base alloys, a brazing temperature of about 1875° to about 2100° F. is satisfactory. In the case of iron and iron-base alloys, a temperature of about 1925° to about 2100° F. is satisfactory. In the case of manganese and manganese-base alloys, a temperature of about 1770° to about 2000° F. is satisfactory. In the case of nickel and nickel-base alloys, a temperature of about 1620° to about 2100° F. is satisfactory. When metal-base alloys are referred to herein, the named metal constitutes at least about 50% of the alloy. In general, the satisfactory brazing temperature will be above the metal-metal phosphide eutectic temperature for the metal or alloy in question. Usually, a brazing temperature at least about 25° F. above the said eutectic temperature will be used and a temperature about 50° F. above said eutectic temperature is a preferred brazing temperature.

For the purpose of giving those skilled in the art a better understanding of the invention, the following illustrative examples are given:

EXAMPLE I

A slurry mixture (Slurry No. 1) containing about 3.3 parts of diammonium hydrogen phosphate $$(NH_4)_2HPO_4$$

to one part of water was prepared. Portions of this slurry mixture were employed to produce joints between articles made of, respectively, copper, a commercial grade of nickel, a nickel-chromium-iron alloy containing approximately 7% iron, 14% chromium, balance essentially nickel (such as is sold commercially under the trademark "Inconel"), and a nickel-copper alloy containing approximately 30% copper (such as is sold commercially under the trademark "Monel"). In making the brazed joints, pre-selected portions of the metal articles were coated with the slurry. The coated portions of the metal articles were then placed in contact and inserted in a brazing furnace where they were exposed for about fifteen minutes to the brazing temperature indicated in an atmosphere of dry hydrogen. In each case, a successful joint of high quality was produced. The details relating to the production of these successful joints are set forth in the following schedule:

*Table I*

| Braze No. | Joint Metal | Joint Type | Brazing Temperature, ° F. |
|---|---|---|---|
| 1 | Nickel | Flat and T | 1,700 |
| 2 | Nickel [2] | Flat and T | 1,700 |
| 3 [1] | Nickel-Chromium-Iron Alloy | T | 1,800 |
| 4 [1] | Nickel-Chromium-Iron Alloy [2] | T | 1,800 |
| 5 | Copper | T | 1,500 |
| 6 | Nickel-Copper Alloy | T | 1,500 |

[1] 5% borax added to the brazing compound slurry.
[2] Joint members oxidized for one hour in air at 1,700° F. before brazing.

EXAMPLE II

A series of phosphorus-containing compounds were made up as water slurries containing about 25% to 50% water to form brazing compounds. The compounds employed are set forth in the following Table II:

*Table II*

| Slurry No. | Composition, Dry Basis |
|---|---|
| 2 | Sodium ammonium phosphate ($NaNH_4HPO_4$). |
| 3 | Sodium hypophosphite ($NaH_2PO_2$). |
| 4 | Sodium pyrophosphate ($Na_4P_2O_7$). |
| 5 | Potassium di-hydrogen phosphate ($KH_2PO_4$). |
| 6 | Potassium mono-hydrogen phosphate ($K_2HPO_4$). |
| 7 | Monobasic calcium phosphate ($Ca(H_2PO_4)_2$). |
| 8 | Di-basic calcium phosphate ($CaHPO_4$). |

Portions of the foregoing slurry mixtures were applied by brushing to pre-selected portions of metal bars made from copper, a commercial grade of nickel and the afore-described nickel-copper alloy. The metal bars were assembled to form T-joints and were heated in an atmosphere of dry hydrogen for about 5 minutes. In each case, a satisfactory brazed joint was produced. The details of the tests are set forth in the following Table III:

*Table III*

| Braze No. | Slurry No. | Joint Metal | Brazing Temperature, ° F. |
|---|---|---|---|
| 7 | 2 | Nickel | 1,900 |
| 8 | 3 | do | 1,900 |
| 9 | 4 | do | 1,900 |
| 10 | 5 | Copper | 1,700 |
| 11 | 5 | Nickel-Copper Alloy | 1,900 |
| 12 | 5 | Nickel | 1,900 |
| 13 | 6 | Copper | 1,700 |
| 14 | 6 | Nickel-Copper Alloy | 1,900 |
| 15 | 6 | Nickel | 1,900 |
| 16 | 7 | Copper | 1,700 |
| 17 | 7 | Nickel-Copper Alloy | 1,900 |
| 18 | 7 | Nickel | 1,900 |
| 19 | 8 | Copper | 1,700 |
| 20 | 8 | Nickel-Copper Alloy | 1,900 |
| 21 | 8 | Nickel | 1,900 |

EXAMPLE III

In another example, paste-like water mixtures were made, respectively, with sodium pyrophosphate (having a sodium:phosphorus atomic ratio of 2:1) and sodium hypophosphite (having a sodium:phosphorus atomic ratio of 1:1). These paste-like mixtures contained about 25% water. The pastes were applied to pre-selected portions of bars made from a commercial grade of nickel and the respectively treated bars were then assembled in T-form and were inserted in a brazing furnace. The T-form bars were then brazed at 1700° F. in hydrogen for about fifteen minutes and satisfactory brazed joints were formed.

It was found that a paste mixture of tri-sodium phosphate (having a sodium:phosphorus atomic ratio of 3:1) and water tested under the same conditions as Example III did not produce a satisfactory joint. Similarly, tri-potassium phosphate ($K_3PO_4$), having a potassium:phosphorus atomic ratio of 3:1, produced unsatisfactory joints under the conditions given for Brazes Nos. 10 to 15 wherein satisfactory joints were obtained using brazing compounds within the invention having potassium:phosphorus atomic ratios of 1:1 (Slurry No. 5) and of 2:1 (Slurry No. 6). Again, tri-calcium phosphate $Ca_3(PO_4)_2$ having a calcium:phosphorus atomic ratio of 3:2 produced unsatisfactory joints under the conditions given for Brazes Nos. 16 to 21 wherein satisfactory joints were obtained using brazing compounds within the invention having calcium:phosphorus ratios of 1:2 (Slurry No. 7) and 1:1 (Slurry No. 8).

An index of the commercial acceptability of the brazing process embodying the present invention is believed to be the fact that successful joints can be made in oxidized nickel-chromium-iron alloy materials using only the reducible phosphorus compound-flux mixture as the brazing agent. This is in contrast to prior brazing methods which have almost universally required that the materials to be joined be entirely free of oxide prior to brazing.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:
1. In the method for joining by brazing metal articles comprised predominantly of metal from the iron group wherein said metal articles are placed in close contact with the brazing material at the contacting points and the resulting assembly is then heated to the brazing temperature, the improvement which comprises using as the brazing material a material consisting essentially of up to 25% of a flux, with the balance a reducible oxygen-containing phosphorus compound selected from the group consisting of phosphorus oxides, phosphorus acids, ammonium phosphates and phosphites, alkali metal phosphates and phosphites having an atomic ratio of alkali metal to phosphorus not greater than about 2:1 and alkaline earth metal phosphates and phosphites having an atomic ratio of alkaline earth metal to phosphorus not greater than about 1:1 and conducting the brazing operation in a reducing atmosphere selected from the group consisting of dry hydrogen and dissociated ammonia at a temperature of about 1600° F. to about 2100° F.

2. The method according to claim 1 wherein the brazing material is applied as a water slurry with up to about 95% water.

References Cited in the file of this patent

UNITED STATES PATENTS

| | | |
|---|---|---|
| 1,853,370 | Marshall | Apr. 12, 1932 |
| 2,258,681 | Hoglund | Oct. 14, 1940 |
| 2,445,858 | Mitchell et al. | July 27, 1948 |
| 2,633,631 | Horvitz | Apr. 7, 1953 |
| 2,645,006 | Hadley | July 14, 1953 |
| 2,661,282 | Daley | Dec. 1, 1953 |
| 2,714,760 | Boam et al. | Aug. 9, 1955 |
| 2,795,040 | Antel et al. | June 11, 1957 |
| 2,822,609 | Horvitz | Feb. 11, 1958 |

FOREIGN PATENTS

| | | |
|---|---|---|
| 15,443 | Australia | Dec. 5, 1934 |
| 483,156 | Great Britain | Apr. 13, 1938 |